United States Patent
Berndt Briceno

(10) Patent No.: US 8,999,416 B2
(45) Date of Patent: Apr. 7, 2015

(54) STABILIZING AND DYEING PROCESS FOR STRAWBERRIES

(75) Inventor: Denis Gustavo Berndt Briceno, Santiago (CL)

(73) Assignee: ATP Corp., Panama (PA)

(*) Notice: Subject to any disclaimer, the term of this patent is extended or adjusted under 35 U.S.C. 154(b) by 19 days.

(21) Appl. No.: 13/808,151

(22) PCT Filed: Jul. 8, 2011

(86) PCT No.: PCT/IB2011/001921
§ 371 (c)(1),
(2), (4) Date: Mar. 14, 2013

(87) PCT Pub. No.: WO2012/004670
PCT Pub. Date: Jan. 12, 2012

(65) Prior Publication Data
US 2013/0171306 A1    Jul. 4, 2013

Related U.S. Application Data

(60) Provisional application No. 61/363,094, filed on Jul. 9, 2010.

(51) Int. Cl.
| | | |
|---|---|---|
| *A23L 1/275* | (2006.01) | |
| *A23B 7/157* | (2006.01) | |
| *A23B 7/154* | (2006.01) | |
| *A23L 1/212* | (2006.01) | |
| *A23L 3/3454* | (2006.01) | |
| *A23L 3/3463* | (2006.01) | |

(52) U.S. Cl.
CPC ............... *A23B 7/157* (2013.01); *A23B 7/154* (2013.01); *A23L 1/2123* (2013.01); *A23L 1/275* (2013.01); *A23L 1/2756* (2013.01); *A23L 3/3454* (2013.01); *A23L 3/3463* (2013.01)

(58) Field of Classification Search
CPC .... A23B 7/157; A23B 1/2756; A23B 3/3454; A23B 3/3463
USPC .......................... 426/615, 250, 262, 267, 270
See application file for complete search history.

(56) References Cited

U.S. PATENT DOCUMENTS

| | | | | |
|---|---|---|---|---|
| 2,511,609 | A | * 6/1950 | Weast | 426/548 |
| 3,472,662 | A | 10/1969 | Mason | 99/168 |
| 5,164,212 | A | 11/1992 | Nafisi-Novaghar et al. | 426/250 |
| 5,310,567 | A | 5/1994 | Nakaji et al. | 426/250 |

FOREIGN PATENT DOCUMENTS

| | | | |
|---|---|---|---|
| EP | 0 266 141 | A2 | 5/1988 |
| EP | 1 228 703 | A2 | 8/2002 |

* cited by examiner

*Primary Examiner* — Helen F Heggestad
(74) *Attorney, Agent, or Firm* — Fitzpatrick, Cella, Harper & Scinto

(57) ABSTRACT

A method to stabilized and impart color to strawberries, which can be fresh, or optionally IQF treated. This method comprises several stages including cuticle removal, alkalinization of the fruit pulp, infusion of a soluble stabilizing agent by immersion in an alkaline media to give the necessary firmness and texture integrity, infusion of dyeing agents by immersion in an alkaline color solution, fixation of said color and stabilizing agents in an acidic solution that has been enriched with polyvalent cations, and ulterior processes to preserve and extend the shelf life.

8 Claims, No Drawings

STABILIZING AND DYEING PROCESS FOR STRAWBERRIES

FIELD OF THE INVENTION

The present invention relates to dyeing and stabilizing of strawberries through a series of steps and with the use of dyeing and stabilizing agents and auxiliaries to obtain a final product with a stable non-bleeding color, appropriate firmness of pulp, and desirable organoleptic features that are able to withstand thermal or chemical processing, light and time, and thus are suitable for its use in fruit products.

BACKGROUND OF THE INVENTION

The consumption of strawberries is generally restricted to seasonal availability, due to short shelf life, fast ripening and/or poor capacity to stand storage. Out of season, the market turns to frozen or chilled fruits, and preserved versions, with poor organoleptic properties. There is therefore, an unsatisfied need in the market for high quality canned strawberry.

U.S. Pat. No. 5,164,212 describes a method to color cherries using cochineal, multivalent metal ions and acid. The cherries are infused with a mixture of calcium ions, other multivalent metal ions, and cochineal dye at a pH at which the dye is in soluble form. The cherries are then infused with an acidification solution which results in the precipitation of an insoluble carmine-metal ion complex within the cherries. Here, the cherries must be cut in halves so the pulp can be exposed to the different process solutions. The description of the preferred embodiments in the patent also recommends a heating process to fix the color, at temperatures as high as 210° F. for times as long as five hours, which is suitable for cherries which have a high intrinsic firmness.

U.S. Pat. No. 5,310,567 describes a single step method which involves the direct addition of natural or artificial dyes into the can. The method comprises the steps of removing the cuticle layer of unripe strawberries, charging the strawberries in a container together with a dyeing solution containing the dyeing agent (cochineal and/or lac), degassing the contents of the container, then sealing the container and heating the sealed container.

SUMMARY OF THE INVENTION

The present invention provides a process to obtain colored fruits, and in particular strawberries, with the necessary firmness, texture, flavor and non-bleeding color to be commercialized as a sensory desirable product.

The present invention provides a suitable method for the coloration of ripe fleshy fruits, like strawberries, without affecting the texture, and at the same time achieving the necessary firmness, texture, flavor, natural appearance and attractive non-bleeding color to be commercialized as a sensory desirable fruit product.

After studying processes for coloring strawberries and other types of fleshy fruits, the present invention provides a process based on the use of stabilizing agents and natural colorants for preparing a very stable, firm, non-bleeding naturally colored strawberry with natural texture and flavor, and a stable fruit product that withstands thermal and/or chemical sterilization processes, light and time without the loss of color, texture and hardness or flavor.

While the description of the features and aspects of the present invention are described herein with respect to a strawberry, the invention also relates to the stabilization of the other fruits in accordance with the methods described herein.

An aspect of the present invention includes a method for dyeing and stabilizing a strawberry, comprising the steps of: (a) immersing a strawberry in an alkaline solution and removing a cuticle layer of the strawberry; (b) immersing the decuticled strawberry into the following solutions: i) an alkaline solution containing a stabilizing agent, and infusing the stabilizing agent into the decuticled strawberry; ii) an alkaline solution containing a dyeing agent, and infusing the dyeing agent into the decuticled strawberry; and iii) an acid solution that has been enriched with an ion selected from at least one of a calcium ions and a polyvalent cation, to fixate the stabilizing agent and the dyeing agent; and (c) rinsing and storing the resulting strawberry.

A further aspect of the present invention provides that the pH level of step (a), step (b)(i) and step (b)(ii) above is from about 7 to 13.

A further aspect of the present invention provides that the pH level of step (c) is from about 2 to 7.

A further aspect of the present invention provides that step (b)(iii) is conducted prior to either of steps (b)(i) and (b)(ii).

The invention relates to the method of the present invention for dyeing and stabilizing a strawberry as well as a dyeing and stabilizing a plurality and large number of strawberries. The invention relates to the method of the present invention for dyeing and stabilizing a strawberry as well as a dyeing and stabilizing a plurality, including a large number, of strawberries.

The ion for fixating the stabilizing agent or dyeing agent is a polyvalent cation, which is typically calcium but can also be another polyvalent cations, and can be a single ion species or a mixture of different ion species.

Another aspect of the present invention includes a method for dyeing and stabilizing a strawberry, comprising the steps of: (a) immersing a strawberry in an alkaline solution and removing a cuticle layer of the strawberry; (b) immersing the decuticled strawberry in an alkaline solution containing a stabilizing agent, and infusing the stabilizing agent into the decuticled strawberry; (c) immersing the decuticled strawberry in an alkaline solution containing a dyeing agent, and infusing the dyeing agent into the decuticled strawberry; (d) immersing the decuticled strawberry in an acid solution that has been enriched with an ion selected from at least one of a calcium ions and a polyvalent cation, to fixate the stabilizing agent and the dyeing agent; and (e) rinsing and storing the resulting strawberry.

A further aspect of the present invention provides that the pH level of step (a), step (b) and step (c) above is from about 7 to 13.

A further aspect of the present invention provides that the pH level of step (d) is from about 2 to 7.

A further aspect of the present invention provides that the ion is infused into the strawberry prior to step (b).

A further aspect of the present invention provides that the strawberry is selected from the group consisting of a fresh strawberry, a frozen strawberry, and an individually quick-frozen (IQF) fruit.

A further aspect of the present invention provides that the stabilizing agent is selected from the group consisting of alginic acid and a salt, the salt thereof selected from the group consisting of sodium, potassium, ammonium, and propylene glycol; gellan gum; a calcium reactive pectin, the pectin selected from the group consisting of low-ester pectin and amidated pectin; carrageenan, the carrageenan selected from the group consisting of iota and kappa forms and its salt, the salt thereof selected from the group consisting of ammonium, potassium, and sodium; and carboxymethyl cellulose; and mixtures thereof A further aspect of the present invention provides that the dyeing agent is selected from the group consisting of cochineal, lac, curcumin, and norbixin.

A further aspect of the present invention provides that the polyvalent cation is selected from the group consisting of aluminum, tin, iron, copper, nickel, zinc, and magnesium.

Another aspect of the present invention includes that a subsequent process to preserve and extend the shelf life of the resulting strawberry, and that the subsequent processes to preserve and extend the shelf life is selected from the group consisting of pasteurization, ultra high pressure treatment, freezing, vacuum, chemical or osmotic inhibition, and irradiation.

A further aspect of the present invention is a stabilized strawberry or strawberries, consisting of a strawberry (or strawberries) comprising a stabilizing agent and a dyeing agent, and an ion selected from at least one of a calcium ions and a polyvalent cation as a fixating agent for the stabilizing agent and the dyeing agent. The stabilized strawberry can include one(s) made by the method of the present invention. The strawberry (or strawberries) can include a native strawberry without a cuticle.

DETAILED DESCRIPTION OF THE INVENTION

In the following detailed description all references to "%" are by weight, unless otherwise specified.

A. Cuticle Removal

The desired level of ripeness for the process disclosed on the invention is that which renders the most intense flavor attributes and aptness for direct consumption. Alternatively, individually quick frozen (IQF)-treated fruits can be used.

Customary processes for the industrial preconditioning of the fruits are recommended, such as selection, washings, removal of stems and leaves, etc.

The strawberries should be submitted to a process which allows the direct exposure of the pulp to the stabilizing and fixing agents. The above process may include alkaline cuticle removal.

Alkaline removal of the cuticle is carried on by immersion of the fruit, in an alkali solution, that can be prepared with alkalis such as sodium hydroxide, potassium hydroxide, sodium carbonate, or similar substances. Preferably, this alkali solution should be prepared at a concentration between 0.1-10% NaOH aqueous solution, preferably between 1-8%, and most preferably 2-6% NaOH solution, at about 10-90° C., preferably from 40-90° C., more preferably at 80° C., for a period from 1-30 seconds, preferable for 2-15 seconds, and most preferable for 10 seconds.

Also the amount of solution regarding the fruit should be considered for the best result, in a weight ratio from 20:1 to 1:1, preferably of 5:1 to 1:1 and most preferably of 2:1.

Also it could be optionally desirable to cut, dice or slice the fruit to obtain smaller pieces of suitable form and size in order to provide an appealing appearance.

B. Alkalinizing, Stabilizing and Dyeing

The present invention provides that the strawberries can be alkalinized in a certain way in which many of its attributes, like flavor/aroma and texture are not affected.

Thus, after the cuticle removal, the strawberries are alkalinized. This process can take place simultaneously with the stabilizing processes. The alkalinizing stabilizing solution can be used in a weight ratio between 10:1 and 0.8:1 (solution to fruits), preferably between 2:1 and 1:1 and most preferably of 1.1:1.

The alkalinization is provided by suitable alkalizing agents, which can be of organic or inorganic nature. Examples of suitable alkalizing agents include, but are not limited to,: sodium hydroxide, potassium hydroxide, calcium carbonate, sodium carbonate, magnesium hydroxide, ammonium hydroxide, amides, and their mixtures. More preferred alkalinizing agents are: sodium hydroxide, potassium hydroxide and ammonium hydroxide. Preferably, the alkalinization takes place so that the pH of the pulp is between 7-13, with pH 8-11 being preferable. In the most preferred embodiment, the pH of the pulp is 9.5 to 10.5.

The present invention also provides that the infusion under this alkaline condition of certain hydrocolloids that form gels in acidic conditions and/or in presence of a polyvalent cation, like calcium (gelling stabilizing agents), can restore or maintain the texture of the fruit and add or maintain its firmness and hardness, even in high temperature conditions like pasteurization or after freezing and thawing cycles like in the IQF strawberries.

Examples of a gelling stabilizing agent includes, but is not limited to: alginic acid and its salts (sodium, potassium, ammonium and propylene glycol); gellan gum; calcium reactive pectins (low-ester pectin and amidated pectin), carrageenans (iota and kappa forms) and its salts (ammonium, potassium, or sodium), and carboxymethyl cellulose, and mixtures thereof Preferably, the amount of gelling stabilizing agent in the alkalinizing stabilizing solution is between 0.005% and 5%, more preferably 0.01% and 2%, and in the most preferred embodiment 0.02% and 1%.

The gelling stabilizing agent can be added in combination with other secondary thickeners, stabilizers, and/or gelling agents to increase the firmness of the fruit. The said secondary stabilizing agents may include vegetable, algal and microbiological hydrocolloids like agar-agar, carrageenan, processed eucheuma seaweed, arabinogalactan, cassia gum, locust bean gum, oat gum, guar gum, tragacanth, acacia gum, xanthan gum, karaya gum, tara gum, gum ghatti, glucomannan, pectins.

Also, complex carbohydrates like starches, modified starches and modified cellulose polymers like methyl cellulose, ethyl cellulose, hydroxypropyl cellulose, hydroxy propyl methyl cellulose, ethyl methyl cellulose, carboxymethyl cellulose, sodium carboxy methyl cellulose and enzymatically hydrolysed carboxymethylcellulose can be used as secondary thickeners, stabilizers, and/or gelling agents.

The present invention further provides that under the said alkaline condition, natural red dyes like cochineal or lac lakes, and yellow dyes like norbixin and curcumin, can be infused into the pulp, and after exposure of the alkalinized and dyed fruit to acidic conditions and/or to polyvalent cations like calcium, a non-bleeding natural strawberry red color can be obtained.

Cochineal and lac lakes, curcumin and norbixin are soluble and stable under alkaline conditions but precipitate in the presence of acids and/or polyvalent cations like calcium. Preferably, the dyeing takes place so that the color intensity of the alkalinizing dyeing solution is between 0.01 and 1, with 0.05 to 0.8 being preferable. In the most preferred embodiment, the color intensity of the alkalinizing dyeing solution is 0.1 to 0.5. Color intensity is defined as the absorbance of a 1% alkalinized solution (pH>8) in distilled water, at the wavelength of maximum absorbance for the colorant ($\lambda_{max\ cochineal/lac}$=520 nm, $\lambda_{max\ annatto}$=453 nm, $\lambda_{max\ curcumin}$=425 nm).

The temperature of the alkalinizing stabilizing processes should be as low as possible to avoid damage to the fruit. Preferably, the temperature range is between 0° C. and 40° C., more preferably between 4° C. and 25° C. and most preferred between 6° C. and 12° C.

The length of the alkaline step depends on the ripeness of the fruit and the temperature of the solution. Preferably, time range of exposure is between 20 min and 24 hours, preferably between 1 and 8 hours and most preferably between 2 and 4 hours.

The order of the addition of the components (stabilizing agents and dyes) of the alkaline solutions is not relevant, provided that the solubility, and preferably complete solubility, of the dyes and the stabilizing agents is obtained.

C. Fixation

Once the alkaline dyeing process is finished, the treated strawberry is immersed in a fixing acid solution containing certain substances that facilitate the precipitation of the soluble dyes and the gelling of the stabilizing agent.

This fixing acid solution should be used in a weight ratio between 10:1 and 0.8:1 (solution to fruits), preferably between 3:1 and 1:1 and most preferably of 2:1.

The gelling stabilizing agents and dyes infused into the fruit during the alkaline step are fixed by the acid present in the fixing acid solution. The acid condition allows the formation of gels and precipitation of the dyes. The acid conditions are provided by means of suitable inorganic and/or organic acids such as: hydrochloric acid, sulphuric acid, phosphoric acid, nitric acid, citric acid, fumaric acid, acetic acid, tartaric acid, malic acid, oxalic acid, tannic acid, benzoic acid, propionic acid, lactic acid, ascorbic acid, etc. Among these the following are preferred: ascorbic acid, citric acid, lactic acid, malic acid and tartaric. Preferably, the acidification takes place so that the pH of the pulp is between 2-7, with pH 3-5 being preferable. In the most preferred embodiment, the pH of the pulp is 3.5 to 4.5.

The gelling stabilizing agents and dyes infused into the fruit during the alkaline step are fixed by polyvalent cations that allow the formation of gels and precipitation of the dyes. The rheological property of the gel formed by the stabilizing agents and the color distribution and hue of the precipitated dyes depends on the type of polyvalent cation, their concentration and on the combinations of the cation used. Preferably, calcium is used as the main gelling/fixing polyvalent cation because it allows obtaining gels with satisfactory rheological properties and a homogeneous red color. Other suitable polyvalent cations are (but not limited to): aluminum, tin, iron, copper, nickel, zinc or magnesium.

Preferably, polyvalent cation salts are those in the forms of citrates, lactates, malates, propionates, chlorides, etc. Most preferred are calcium lactates and chlorides. Hardness (express as calcium) target values are between 100-20,000 ppm, preferably between 1,000-10,000 ppm and most preferably between 2,000-8,000 ppm.

The temperature of the fixing processes should be as low as possible to avoid damage of the fruit. Preferably, temperature range is between 0° C. and 40° C., more preferably between 4° C. and 25° C. and most preferred between 6° C. and 12° C.

Preferably, time range of exposure to the fixing acid solution is between 20 min and 24 hours, preferably between 1 and 8 hours and most preferably between 2 and 4 hours.

The order of the addition of the components of the fixing acid solution is not relevant. The acid could be added first, and then the cation donors, or vice versa, or they also could be added simultaneously.

Optionally, calcium ions and/or polyvalent cations can be infused into the strawberry prior to the infusion of the stabilizing and dyeing agents.

D. Optional Auxiliary Agents

It may be desirable to add certain additives to improve the shelf life and palatability of the preserved strawberries. These optional additives can be infused during any of the processing stages or in the packing syrup if strawberries are packed (i.e. canned) for pasteurization or other sterilization treatment. These auxiliary agents may comprise the following:

Antioxidant agents, such as, but not limited to: ascorbic acid and its salts, erythorbic acid and its salts, rosemary extract, flavonoids, etc.

Flavoring agents, such as, but not limited to natural flavorings, identical to natural flavorings, artificial flavorings, fruit juices, etc.

Preservatives, such as, but not limited to: lactic, sorbic, propionic, formic and benzoic acids and their salts (sodium, potassium, calcium, etc.) and derivatives, sulfites (in any chemical form), etc.

Acidity regulators such as, but not limited to: lactic, citric, malic, fumaric, tartaric, succinic and ascorbic acids and its salts (sodium, potassium, ammonium, calcium, etc.), etc.

Sweeteners and flavor enhancers such as, but not limited to: acesulfame potassium, aspartame, isomalt, isomaltitol, saccharin and its sodium, potassium and calcium salts, sucralose, alitame, thaumatin, glycyrrhizin, neohesperidine dihydrochalcone, stevioside, neotame, lactitol, xylitol, mannitol, glycerol, sucrose, fructose, honey, etc.

Firming agents such as, but not limited to: calcium, magnesium or aluminum organic or inorganic salts like calcium hydrogen sulfite, monocalcium citrate, dicalcium citrate, calcium citrate (tricalcium citrate), monocalcium phosphate, dicalcium phosphate, tricalcium phosphate, calcium chloride, magnesium chloride, magnesium sulfate, aluminium sulphate, aluminium sodium sulphate, calcium gluconate, etc.

Food dyes such as, but not limited to: synthetic food dyes like, FD&C Red N° 40 (Allura Red AC, E129), FD&C Yellow N° 5 (Tartrazine, E102), FD&C Yellow N° 6 (Sunset Yellow FCF, E102), etc., and natural dyes like anthocyanins, cochineal, lacaic acid, beetroot, monascus, turmeric, annatto, carotenoids and xanthophylls like: canthaxanthin, lycopene, paprika, lutein, betacarotene, beta-apo-carotenal, caramel, gardenia red, gardenia yellow, carthamus, saffron, riboflavin, etc.

E. Preservation Processes

Several preservation options are available to get an acceptable shelf life for the final product. Alternatives are: pasteurization, high pressure treatments, freezing, vacuum, chemical or osmotic inhibition and irradiation or any other means to stop microbiologic spoilage. Most preferred methods are pasteurization and high pressure pasteurization or processing (HPP).

EXAMPLES

The characteristics and effects of the method of the present invention will now be described in detail by reference to the following Examples that by no means limit the scope of the invention. In these Examples, all references to "%" are by weight.

Example 1

Disclosed Method

Ten (10) kg of ripe strawberries were selected using the criteria of flavor and aroma, and were thoroughly washed. The leaves and stems were removed accordingly to the description of the present invention.

A 4% sodium hydroxide solution was prepared and the strawberries were submerged in this solution in a weight ratio of 2:1 (solution to strawberries). This process helps to remove the cuticle layer of the fruit. The immersion time did not exceed 15 seconds.

After that, the strawberries were rinsed carefully with clean tap water in order to remove the cuticle residues.

An alkalinizing stabilizing dyeing solution was prepared according to Table 1:

TABLE 1

| Alkalinizing stabilizing dyeing solution: | |
|---|---|
| Ingredient | Quantity (grams) |
| Soft Water | 10,820.70 |
| Sodium Alginate | 22.00 |
| Carmine (10% carminic acid) | 74.80 |
| Norbixin (2.5%) | 13.20 |
| Ammonium Hydroxide | 69.30 |

The alkalinizing stabilizing dyeing solution was cooled to a temperature below 12° C. The strawberries were immersed in the alkalinizing stabilizing dyeing solution in a weight ratio of 1.1:1 (solution to fruits) and were left there for 3 hours.

A fixing acid solution was prepared according to Table 2:

TABLE 2

| Fixing acid solution: | |
|---|---|
| Ingredient | Quantity (grams) |
| Soft Water | 18,720.00 |
| Ascorbic acid | 200.00 |
| Calcium lactate | 1,080.00 |

Once the alkaline processes were finished, the strawberries were immersed in the fixing acid solution, in a weight ratio of 2:1 (solution to fruits) and were kept at a temperature below 12° C., for 3 hours.

The strawberries were then rinsed with clean water and packing syrup was prepared according to Table 3:

TABLE 3

| Packing solution: | |
|---|---|
| Ingredient | Quantity (grams) |
| Soft Water | 7,994.00 |
| Citric acid | 6.00 |
| Sucrose | 2,000.00 |

The fruits were immersed in suitable recipients with the packing syrup, in a weight ratio of 1:1 (solution to fruits).

The fruits in the packing syrup were pasteurized at 95° C. for 15 minutes.

After allowing the solution to cool, the strawberries were left at room temperature for 7 days and then evaluated for their sensory features. The firmness and texture was adequate and resembled that of the ripe fruit; the color was brilliant, homogeneous, and very similar to the natural one the flavor profile was according with the expected quality.

Example 2

Disclosed Method: Using Turmeric

Same process as Example 1 but using curcumin instead of norbixin. The alkalinizing stabilizing dyeing solution was prepared according to Table 4.

TABLE 4

| Alkalinizing stabilizing dyeing solution: | |
|---|---|
| Ingredient | Quantity (grams) |
| Soft Water | 10,833.63 |
| Sodium Alginate | 22.00 |
| Carmine (10% carminic acid) | 74.80 |
| Curcumin (95%) | 0.27 |
| Ammonium Hydroxide | 69.30 |

Example 3

Disclosed Method: With Gellan Gum as Stabilizing Agent

Same process as Example 1, but using gellan gum as stabilizing agent, instead of sodium alginate.

The alkalinizing stabilizing dyeing solution was prepared according to Table 5.

TABLE 5

| Alkalinizing stabilizing dyeing solution: | |
|---|---|
| Ingredient | Quantity (grams) |
| Soft Water | 10,836.10 |
| Gellan Gum | 6.60 |
| Carmine (10% carminic acid) | 74.80 |
| Norbixin 2.5% | 13.20 |
| Ammonium Hydroxide | 69.30 |

Example 4

Disclosed Method: With Low Ester Pectin as Stabilizing Agent

Same process as Example 1, but using low ester pectin as stabilizing agent, instead of sodium alginate.

The alkalinizing stabilizing dyeing solution was prepared according to Table 6.

TABLE 6

Alkalinizing stabilizing dyeing solution:

| Ingredient | Quantity (grams) |
|---|---|
| Soft Water | 10,820.70 |
| Low Ester Pectin | 22.00 |
| Carmine (10% carminic acid) | 74.80 |
| Norbixin 2.5% | 13.20 |
| Ammonium Hydroxide | 69.30 |

Example 5

Disclosed Method: With Strawberries Cut in Halves

Same process as Example 1, but using strawberries cut in halves instead of whole fruits. The fruits were cut in halves immediately after the cuticle removal and before the alkalinizing stabilizing dyeing step.

Example 6

Disclosed Method: with IQF Strawberries

Same process as Example 1, but using individually quick frozen (IQF) strawberries instead of fresh. The strawberries were thawed at 8° C. for 24 hours before cuticle removal.

Example 7

Modified Disclosed Method: Without the Use of Any Stabilizing Agent

Same process as Example 1, but without the use of any stabilizing agent. The alkalinizing stabilizing dyeing solution was prepared according to Table 7.

TABLE 7

Alkalinizing stabilizing dyeing solution:

| Ingredient | Quantity (grams) |
|---|---|
| Soft Water | 10,842.70 |
| Carmine (10% carminic acid) | 74.80 |
| Norbixin 2.5% | 13.20 |
| Ammonium Hydroxide | 69.30 |

Example 8

Modified Disclosed Method: Without Removal of the Cuticle

Same process as Example 1, but stabilizing and dyeing the strawberries without removal of the cuticle.

Example 9

Control Trial: Untreated Strawberries

Unprocessed strawberries used as control parameter.
Description of the Sensory Tests Firmness: Measured with a fruit pressure tester (also known as penetrometer) using a 11,3 mm diameter plunger.

Texture: The texture was tested by an expert panel, with a qualitative scale from 1 to 5, being 5 the more similar texture to the fresh ripe fruit and 1 the less similar.

External Color and Pulp Color: The color of the surface was determined using a Hunter Lab instrument.

Flavor and aroma: The flavor and aroma were tested by an expert panel; with a qualitative scale from 1 to 5, being 5 the more similar flavor profile to the fresh ripe fruit and 1 the less similar.

Bleeding: It was measured by determination of the direct absorbance of the syrup with a Shimadzu Mini UV 1240 spectrophotometer at 520 nm wavelength using a 1cm square cell.

The compared results of the sensory tests are shown in Tables 8-12.

TABLE 8

Sensory results before Pasteurization: Comparison of the Disclosed Method with different stabilizing agents with the method done without the removal of the cuticle and to untreated and non-stabilized strawberries

| Example | Firmness (kg) | Texture (1-5) | External Color (Lab space) L, a, b | Flavor/ Aroma (1-5) | Bleeding (absorbance at 520 nm) |
|---|---|---|---|---|---|
| 1 | 3.0 | 4 | 28/41/24 | 4 | 0 |
| 3 | 3.0 | 4 | 28/40/24 | 4 | 0 |
| 4 | 3.0 | 4 | 28/40/25 | 4 | 0 |
| 7 | 3.0 | 3 | 29/36/22 | 4 | 0 |
| 8 | 4.0 | 3-4 | 31/37/23 | 4 | 0 |
| 9 | 6.0 | 5 | 32/40/28 | 5 | 0 |

TABLE 9

Sensory results after Pasteurization: Comparison of the Disclosed Method with different stabilizing agents with the method done without the removal of the cuticle and to untreated and non-stabilized strawberries

| Example | Firmness (kg) | Texture (1-5) | External Color (Lab space) L, a, b | Flavor/ Aroma (1-5) | Bleeding (absorbance at 520 nm) |
|---|---|---|---|---|---|
| 1 | 2.5 | 3-4 | 28/37/23 | 4 | 0.327 |
| 3 | 2.5 | 3-4 | 28/37/23 | 4 | 0.327 |
| 4 | 2.5 | 3-4 | 28/37/23 | 4 | 0.335 |
| 7 | 1.0 | 1 | 29/34/24 | 4 | 0.338 |
| 8 | 0.0 | 1 | 32/28/19 | 4 | 0.321 |
| 9 | 0.0 | 1 | 30/30/19 | 4 | 0.247 |

TABLE 10

Sensory results after Pasteurization: Comparison of the Disclosed Method to turmeric dyed strawberries

| Example | Firmness (kg) | Texture (1-5) | External Color (Lab space) L, a, b | Flavor/ Aroma (1-5) | Bleeding (absorbance at 520 nm) |
|---|---|---|---|---|---|
| 1 | 2.5 | 3-4 | 28/37/23 | 4 | 0.327 |
| 2 | 2.5 | 3-4 | 27/37/22 | 4 | 0.335 |

TABLE 11

Sensory results before Pasteurization: Comparison of the Disclosed Method to the method applied to strawberries cut in halves and IQF

| Example | Firmness (kg) | Texture (1-5) | Pulp Color (Lab Space) L, a, b | External Color (Lab space) L, a, b | Flavor/ Aroma (1-5) | Bleeding (absorbance at 520 nm) |
|---|---|---|---|---|---|---|
| 1 | 3.0 | 4 | 56/20/20 | 28/41/24 | 4 | 0 |
| 5 | 3.5 | 4 | 34/41/25 | 30/40/25 | 4 | 0 |
| 6 | 1.5 | 2 | 35/29/10 | 26/35/22 | 3 | 0 |

TABLE 12

Sensory results after Pasteurization: Comparison of the Disclosed Method to the method applied to strawberries cut in halves and IQF

| Example | Firmness (kg) | Texture (1-5) | Pulp Color (Lab Space) L, a, b | External Color (Lab space) L, a, b | Flavor/ Aroma (1-5) | Bleeding (absorbance at 520 nm) |
|---|---|---|---|---|---|---|
| 1 | 2.5 | 3-4 | 45/24/15 | 28/37/23 | 4 | 0.327 |
| 5 | 2.5 | 3-4 | 31/40/23 | 28/36/21 | 4 | 0.391 |
| 6 | 1.5 | 2 | 39/25/15 | 28/32/21 | 3 | 0.261 |

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

I claim:

1. A method for dyeing and stabilizing a strawberry, comprising steps of:
   a. immersing a strawberry in an alkaline solution and removing a cuticle layer of the strawberry, to produce a decuticled strawberry;
   b. immersing the decuticled strawberry in an alkalinizing, stabilizing, and dyeing solution comprising low ester pectin, carmine, norbixin, and ammonium hydroxide, to produce a stabilized and dyed decuticled strawberry;
   c. fixing the stabilized and dyed decuticled strawberry in an acid solution comprising ascorbic acid and calcium lactate, to produce a fixed, stabilized, and dyed strawberry;
   d. rinsing the fixed, stabilized, and dyed strawberry with clear water, to produce a rinsed, fixed, stabilized, and dyed strawberry; and
   e. pasteurizing the rinsed, fixed, stabilized, and dyed strawberry in a syrup.

2. The method of claim 1, wherein the strawberry is selected from the group consisting of a fresh strawberry, a frozen strawberry, and an individually quick-frozen (IQF) fruit.

3. The method of claim 1, wherein a pH level of step (a) and step (b) is from about 7 to 13.

4. The method of claim 1, wherein a pH level of step (c) is from about 2 to 7.

5. The method of claim 1, further comprising a step of preserving the strawberry to extend a shelf life of the strawberry, wherein the preserving includes a process selected from the group consisting of ultra high pressure treatment, vacuum, chemical or osmotic inhibition, and irradiation.

6. The method of claim 1, wherein a fruit:syrup ratio is 1:1.

7. The method of claim 6, wherein the syrup includes 20% by weight of sucrose.

8. The method of claim 1, wherein, in step b, an alkalinizing, stabilizing, dyeing solution:fruit ratio is 1.1:1.

* * * * *